United States Patent
Kubo et al.

(10) Patent No.: US 6,864,652 B2
(45) Date of Patent: Mar. 8, 2005

(54) DRIVE SYSTEM FOR AUTOMOTIVE VEHICLE OF FRONT-AND-REAR WHEEL DRIVE TYPE

(75) Inventors: Seitoku Kubo, Toyota (JP); Tadanobu Kumagai, Okazaki (JP); Toshifumi Sakai, Okazaki (JP); Naoyuki Sakai, Anjo (JP); Akihiro Ohno, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 31 days.

(21) Appl. No.: 10/422,697

(22) Filed: Apr. 25, 2003

(65) Prior Publication Data
US 2003/0227270 A1 Dec. 11, 2003

(30) Foreign Application Priority Data
Apr. 25, 2002 (JP) ........................... 2002-124642

(51) Int. Cl.⁷ ............... B60K 6/02; B60K 11/14; B60K 17/04
(52) U.S. Cl. ............... 318/362; 318/465; 180/65.2; 180/65.3; 701/22
(58) Field of Search ............... 318/3, 140, 362, 318/465, 466; 477/3, 5, 15; 701/22, 89; 180/65.2, 65.3, 65.4

(56) References Cited

U.S. PATENT DOCUMENTS

| | | | | |
|---|---|---|---|---|
| 6,453,228 B1 | * | 9/2002 | Shimada ................... | 701/89 |
| 6,484,832 B1 | * | 11/2002 | Morisawa et al. ......... | 180/65.2 |
| 6,549,832 B2 | * | 4/2003 | Nakasako et al. .......... | 701/22 |
| 6,576,870 B2 | * | 6/2003 | Wu ........................ | 219/121.72 |
| 6,684,970 B2 | * | 2/2004 | Gotou ..................... | 180/65.2 |
| 6,691,809 B2 | * | 2/2004 | Hata et al. ................ | 180/65.3 |
| 2002/0023790 A1 | * | 2/2002 | Hata et al. ................ | 180/65.3 |
| 2002/0032512 A1 | * | 3/2002 | Shimada .................. | 701/89 |
| 2002/0041167 A1 | * | 4/2002 | Kitano et al. .............. | 318/3 |
| 2002/0055810 A1 | * | 5/2002 | Nakasako et al. .......... | 701/22 |
| 2002/0058564 A1 | * | 5/2002 | Yamamoto et al. ......... | 477/3 |
| 2002/0058565 A1 | * | 5/2002 | Yamamoto et al. ......... | 477/5 |
| 2003/0151381 A1 | * | 8/2003 | Kadota et al. ............. | 318/465 |
| 2004/0069548 A1 | * | 4/2004 | Kira et al. ................ | 180/65.3 |
| 2004/0104059 A1 | * | 6/2004 | Yamamoto et al. ........ | 180/65.2 |

FOREIGN PATENT DOCUMENTS

JP        2001-253256        9/2001

\* cited by examiner

*Primary Examiner*—Paul Ip
(74) *Attorney, Agent, or Firm*—Oblon, Spivak, McClelland, Maier & Neustadt, P.C.

(57) ABSTRACT

A drive system for an automotive vehicle of the front-and-rear wheel drive type, comprising a primary drive mechanism for drive of a set of front road wheels and an ancillary drive mechanism for drive of a set of rear roar wheels, wherein the front road wheels are driven by operation of the primary drive mechanism at a two-wheel drive mode and wherein the front and rear road wheels are driven by operation of both the primary and ancillary drive mechanisms at a four-wheel drive mode. In the drive system, a drive power applied to the primary road wheels is restricted to a predetermined value when the vehicle is driven by the primary and ancillary drive mechanisms at the front-and-rear wheel drive mode.

9 Claims, 7 Drawing Sheets

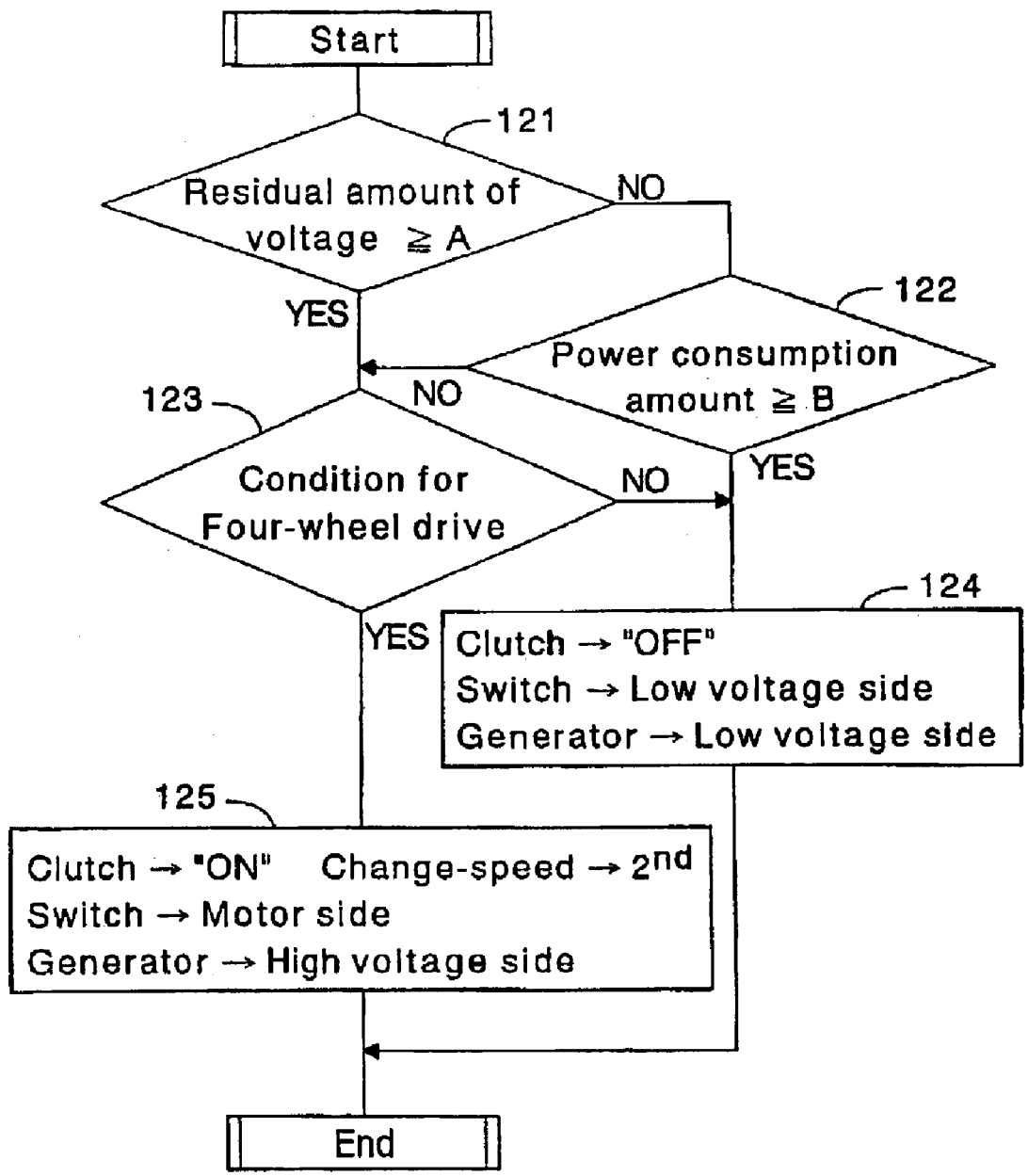

DRIVE SYSTEM FOR AUTOMOTIVE VEHICLE OF FRONT-AND-REAR WHEEL DRIVE TYPE

BACKGROUND OF THE INVENTION

1. Field of the Invention

The present invention relates to a drive system for an automotive vehicle of the front-and-rear wheel drive type.

2. Description of the Prior Art

As one of drive systems for an automotive vehicle of the front-and-rear wheel drive type, there has been proposed a drive system composed of a primary drive mechanism for a set of primary road wheels and an ancillary drive mechanism for a set of ancillary road wheels. In the drive system, the primary drive mechanism is operated to drive the primary road wheels during usual traveling of the vehicle, and the ancillary drive mechanism is operated with the primary drive mechanism to drive the primary and ancillary road wheels at start of the vehicle and during low speed traveling of the vehicle. A drive system of this type is disclosed in Japanese Patent Laid-open Publication No. 2001-253256.

In the drive system, the primary drive mechanism is placed at a front wheel side of the vehicle to be driven by a prime mover of the vehicle, while the ancillary drive mechanism is placed at a rear wheel side of the vehicle to be driven by an electric motor. The drive system includes a first generator driven by the prime mover of the vehicle, a low voltage battery charged with an electric power supplied from the generator, a second generator driven by the prime mover of the vehicle, and an electric motor supplied with an electric power from the second generator for drive of the rear road wheels of the vehicle.

In the drive system, it is advantageous that a longitudinal drive shaft indispensable for transmitting the drive power of a prime mover to a set of rear road wheels in a conventional automotive vehicle of the four-wheel drive type is not required. This is significantly useful to reduce the vehicle weight for decrease of energy consumption.

In the drive system of this type, however, driving conditions of front and rear road wheels and change-speed conditions of the primary drive mechanism such as the prime mover and the power transmission of the vehicle are independently controlled since the front and rear road wheels are not mechanically interconnected by a conventional propeller shaft. Accordingly, if the drive power to the road wheels becomes excessive in a condition where the road wheels are driven by the primary drive mechanism on a road surface of low $\mu$, there will occur racing of the road wheels, resulting in deterioration of the traction performance of the vehicle.

SUMMARY OF THE INVENTION

It is, therefore, a primary object of the present invention to provide a drive system for an automotive vehicle of the front and rear wheel drive type wherein excessive drive power applied to the road wheels on a road surface of low $\mu$ is restricted to prevent racing of the road wheels thereby to prevent deterioration of the traction efficiency of the vehicle.

According to the present invention, the object is accomplished by providing a drive system for an automotive vehicle of the front-and-rear wheel drive type, comprising a primary drive mechanism for drive of a set of primary road wheels and an ancillary drive mechanism for drive of a set of ancillary roar wheels, wherein the primary road wheels are driven by operation of the primary drive mechanism at a two-wheel drive mode and wherein the primary and ancillary road wheels are driven by operation of both the primary and ancillary drive mechanisms at four-wheel drive mode, characterized in that the drive system includes restriction means for restricting a drive power applied to the primary road wheels to a predetermined value when the vehicle is driven by the primary and ancillary drive mechanisms at the front-and-rear wheel drive mode.

In a practical embodiment of the present invention, the restriction means comprises means for restricting a drive power applied to the primary road wheels from the primary drive mechanism to the predetermined value. For example, the restriction means may be in form of means for restricting an output power of an internal combustion engine under control of supply of fuel supplied to the engine from a fuel injection pump or under control of the throttle opening of the engine. Alternatively, the restriction means may be in the form of means for restricting the drive power applied to the primary road wheels under control of a drive power applied from a power transmission. In such a case, the drive power applied from the power transmission is controlled to be less than a maximum speed reduction ratio during travel of the vehicle at the front-and-rear wheel drive mode.

With the provision of the restriction means, even when the primary road wheels of the vehicle are driven on a road surface of low $\mu$ at the four-wheel drive mode, the drive power applied to the primary road wheels does not become excessive. This is effective to prevent racing of the primary road wheels and to prevent deterioration of the traction efficiency of the vehicle at the four-wheel drive mode.

In the drive system according to the present invention, it is preferable that the operation of both the primary and ancillary drive mechanism at the four-wheel drive mode is synchronized with the operation of both the primary and ancillary drive mechanisms at a drive mode on a road surface of low $\mu$. In such a case, an electric control apparatus for the primary and ancillary drive mechanisms is arranged to produce a command signal for synchronizing the operation of both the primary and ancillary drive mechanisms at the front-and-rear wheel drive mode with the operation of the primary and ancillary drive mechanisms at a drive mode on a road surface of low $\mu$. Preferably, the electric control apparatus is arranged to produce a command signal for selecting the front-and-rear wheel drive mode when the vehicle is traveling at a lower speed than a predetermined speed. In addition, the electric control apparatus may be arranged to produce a command signal for switching over a power transmission to a speed range less than a maximum speed reduction ratio at the front-and-rear wheel drive mode.

With the above arrangement of the electric control apparatus, even when the primary road wheels of the vehicle are driven on a road surface of low $\mu$ at the four-wheel drive mode, the drive power applied to the primary road wheels does not become excessive. This is effective to prevent racing of the primary road wheels and to prevent deterioration of the traction efficiency of the vehicle at the four-wheel drive mode.

In a practical embodiment of the drive system, the primary drive mechanism is composed of an internal combustion engine of the vehicle for drive of a set of front road wheels, while the ancillary drive mechanism is composed of an electric motor for drive of a set of rear road wheels, and a generator driven by the internal combustion engine is provided as a source of drive power for the electric motor.

BRIEF DESCRIPTION OF THE DRAWINGS

In the drawings:

FIG. 7 is a flow chart of a control program executed in the electric control apparatus shown in FIG. 6.

DESCRIPTION OF THE PREFERRED EMBODIMENTS

Figure 4:
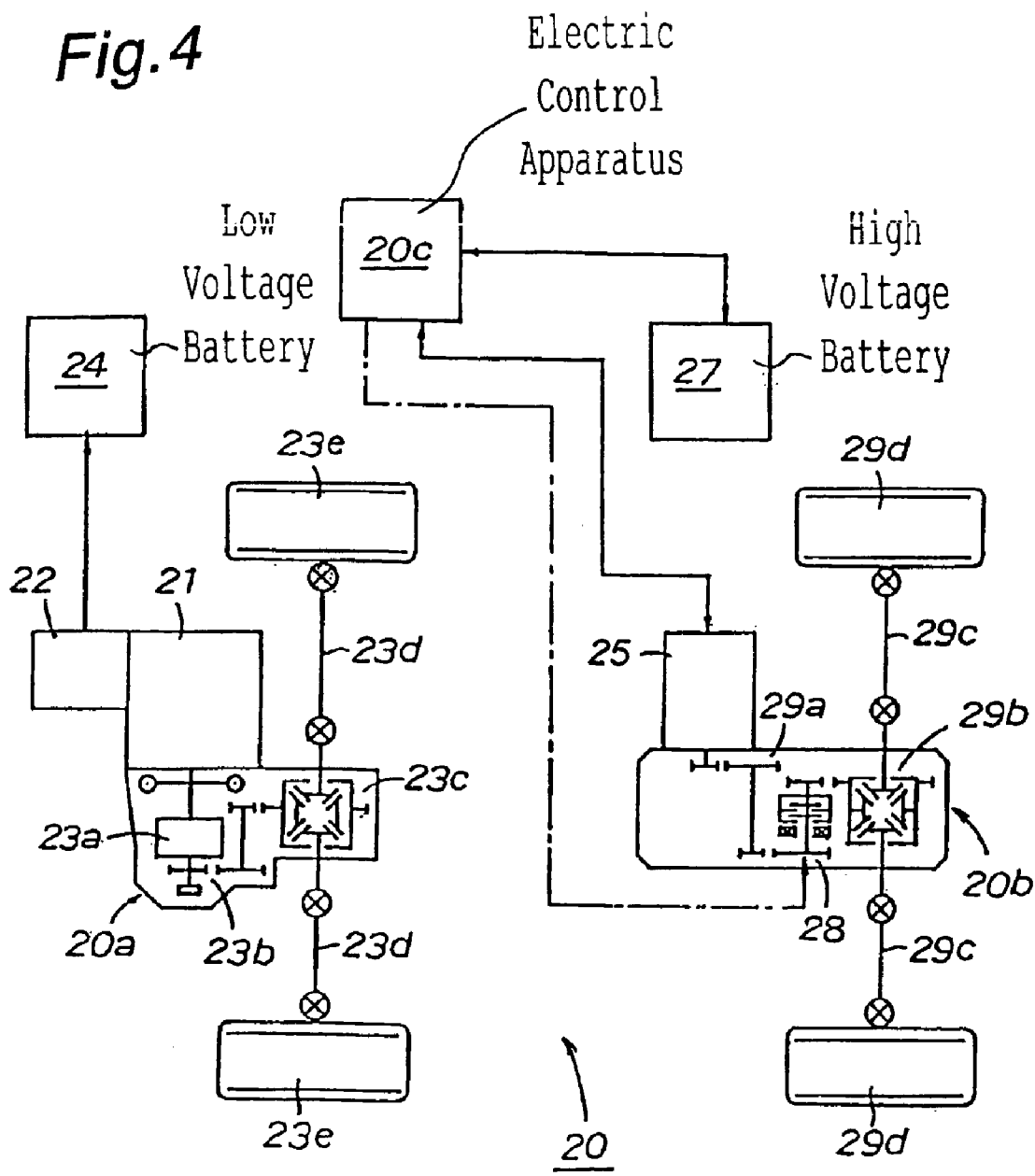
FIG. 4 is a schematic illustration of a second embodiment of a drive system for an automotive vehicle of the front and rear wheel drive type.
Figure 5:
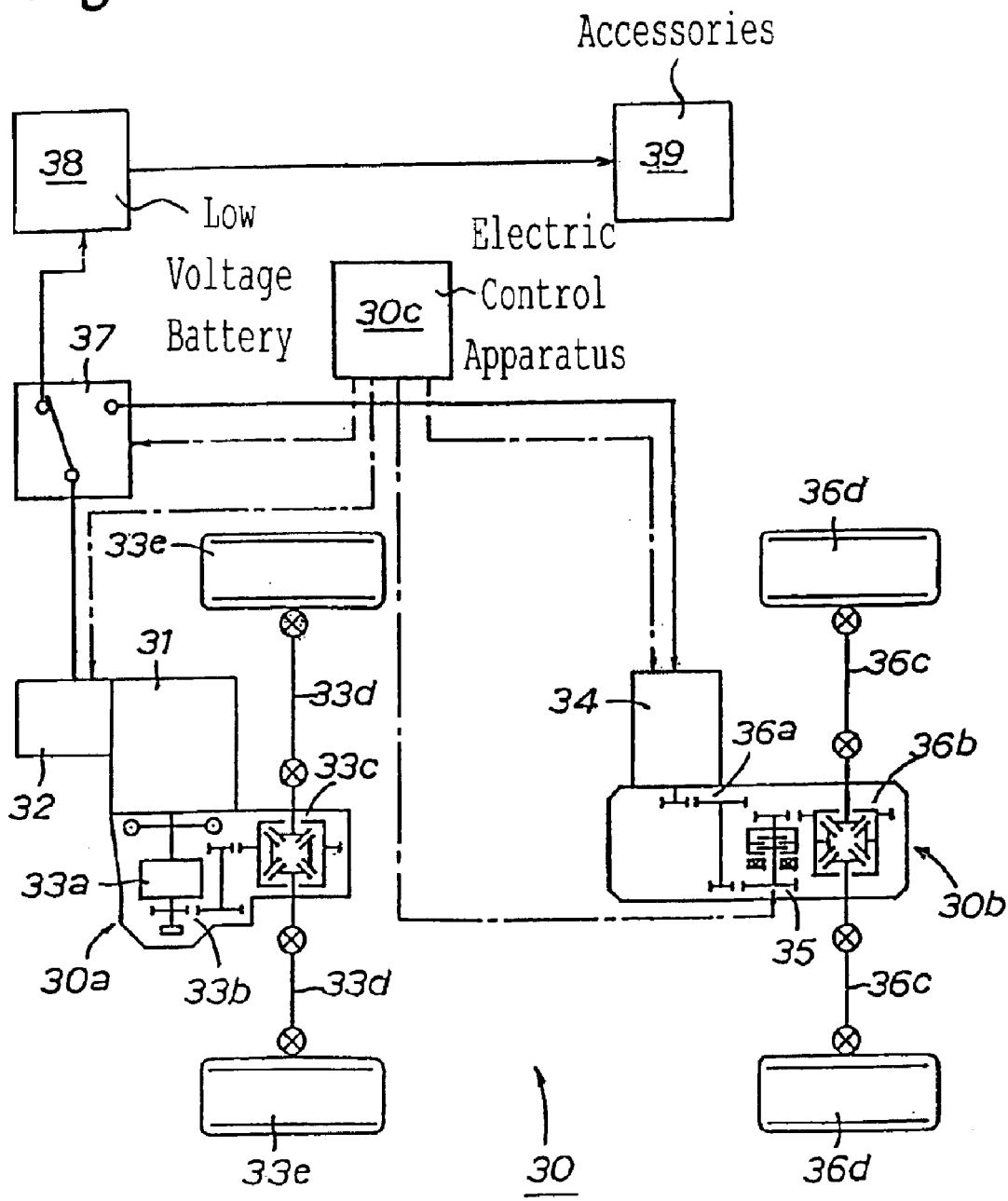
FIG. 5 is a schematic illustration of a third embodiment of a drive system for an automotive vehicle of the front and rear wheel drive type.

The present invention is concerned with a drive system for an automotive vehicle of the front-and-rear wheel drive type, which is composed of a primary drive mechanism for a set of primary road wheels and an ancillary drive mechanism for a set of ancillary road wheels. In practical embodiments, the present invention is adapted to various drive systems for the automotive vehicle as illustrated in FIGS. 1, 4 and 5.

Figure 1:
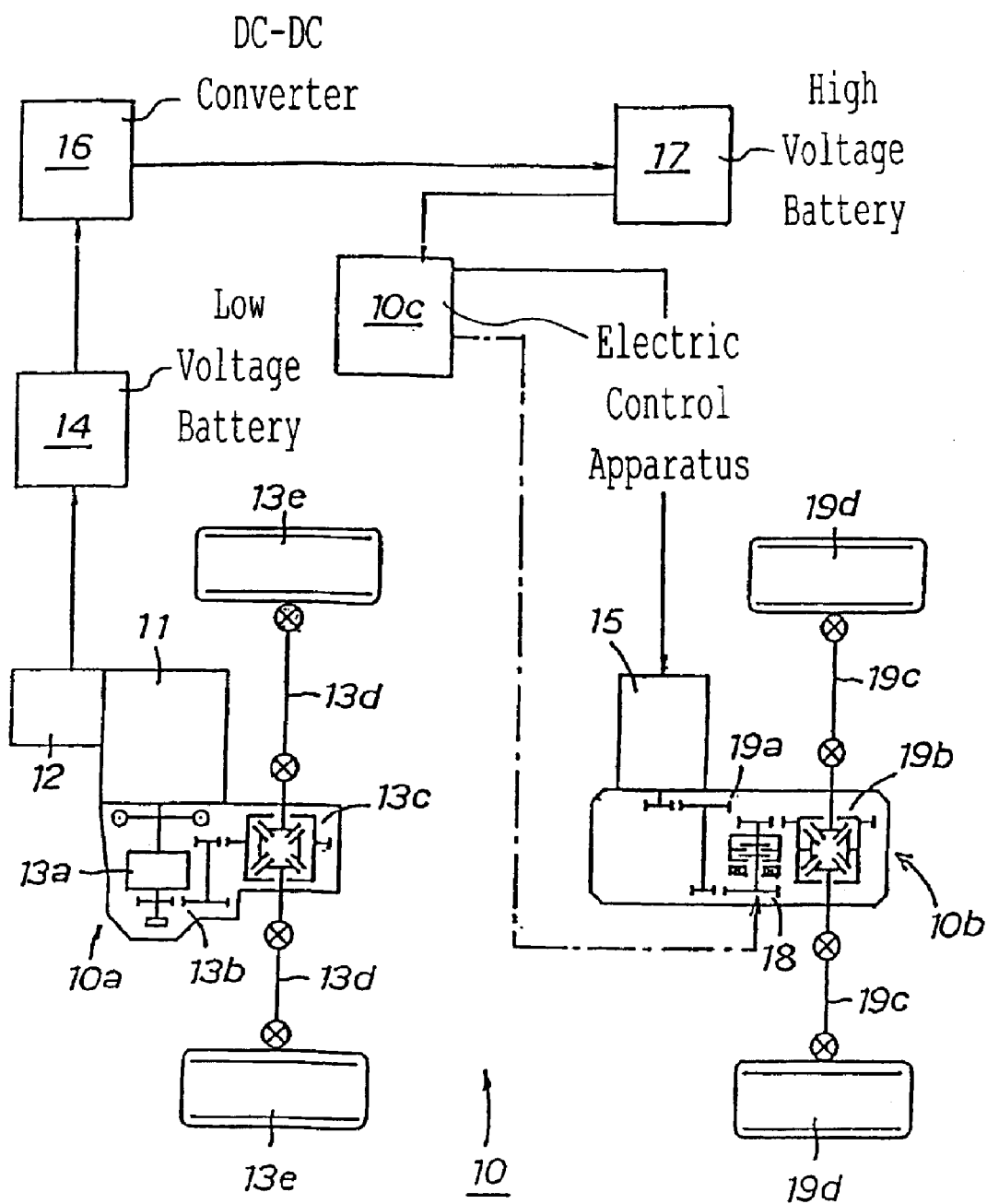
FIG. 1 is a schematic illustration of a first embodiment of a drive system for an automotive vehicle of the front and rear wheel drive type.

In FIG. 1, there is schematically illustrated a first embodiment of a drive system for an automotive vehicle 10 of the front-and-rear wheel type which is composed of a first drive mechanism 10a in the form of a primary drive mechanism for a set of front road wheels 13e and a second drive mechanism 10b in the form of an ancillary drive mechanism for a set of rear road wheels 19d.

The primary drive mechanism 10a includes a prime mover 11 in the form of an internal combustion engine and a generator 12 driven by the prime mover. In the primary drive mechanism 10a, the drive power of the prime mover 11 is transmitted to drive shafts 13d, 13d through a power transmission 13a, a speed reduction gear train 13b and a front differential 13c so that the front road wheels 13e are driven by the drive shafts 13d. In operation of the primary drive mechanism 10a, the generator 12 is driven by the prime mover 11 to generate an electric power, and a low voltage battery 14 in the form of a battery of 12 V for driving accessories is charged with the electric power supplied from the generator 12.

The ancillary drive mechanism 10b includes an electric motor 15, a DC-DC converter 16, a high voltage battery 17 and an electromagnetic clutch 18. The high voltage battery 17 is in the form of a battery of 36 V only for driving the electric motor 15. Although in this embodiment, the electric motor 15 is in the form of an electric motor of the electromagnetized type, a DC motor or a brushless servo motor may be used as the electric motor 15.

The electric motor 15 acts to convert electric energy to mechanical energy and vice versa. In the ancillary drive mechanism 10b, the electric motor 15 is driven by the electric power applied thereto from the battery 17, and the drive power of electric motor 15 is transmitted to drive shafts 19c, 19c through a speed reduction gear train 19a, an electromagnetic clutch 18 and a rear differential 19b to drive the rear road wheels 19d. When applied with a drive power from the rear road wheels 19, the electric motor 15 acts as a generator to generate a regenerative electric power, and the high voltage battery 17 is charged with the regenerative electric power applied from the electric motor 15 through a driving circuit 10c2 of an electric control apparatus 10c.

Figure 2:
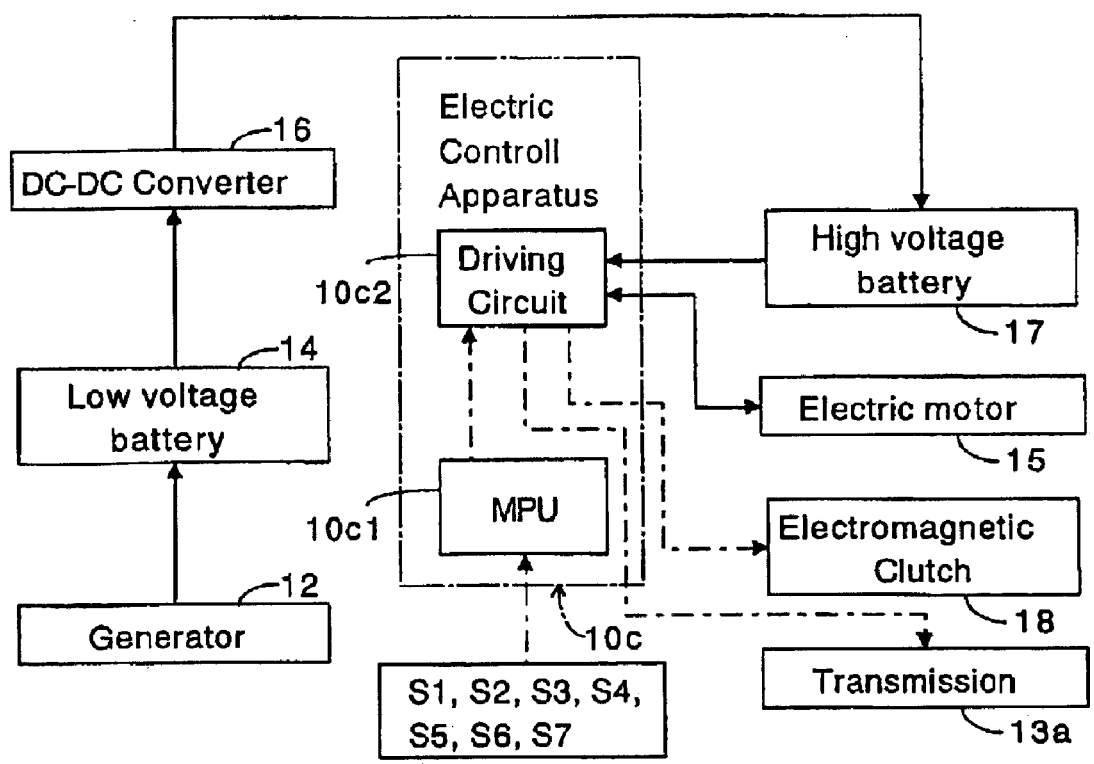
FIG. 2 is a block diagram of an electric control apparatus for the drive system shown in FIG. 1.

As shown in FIG. 2, the electric control apparatus 10c includes a microprocessor or MPU 10c1 which is connected to an accelerator sensor S1, a wheel speed sensor S2, a brake sensor S3, a voltage sensor S4 of the high voltage battery, a switch sensor S5 for detecting a condition of a 4 WD switch, a $\mu$-sensor S6 for detecting road surface conditions and a change-speed sensor for detecting a change-speed step of the power transmission 13a.

The MPU 10c1 includes a central processing unit or CPU and a memory to store a control program and data for controlling the electric motor 15, the electromagnetic clutch 18 and the power transmission 13a. The CPU is applied with detection signals from the sensors S1–S7 through an interface to determine conditions of the electric motor 15, clutch 18 and transmission 13a to be activated and to produce command signals for activating the electric motor 15, clutch 18 and transmission 13a through the interface.

The driving circuit 10c2 is provided to control activation and power generation of the electric motor 15 in response to the command signal applied from the CPU in MPU 10c1 and to control ON-OFF operation of the electromagnetic clutch 18 and changeover of the change-speed step of power transmission 13a in response to the command signal applied from the CPU. The memory of MPU 10c1 is arranged to store a control program for selecting a four-wheel drive mode of the vehicle and a control program for selecting a drive mode on the snow (or on the low $\mu$ road surface). In this embodiment, both the control programs are executed in common by the CPU of MPU 10c. Thus, the 4 WD switch for selection of the four-wheel drive mode and a snow mode switch for selection of a drive mode on the snow are provided in the form of a common switch.

When the 4 WD switch is turned on to select the four-wheel drive mode, the CPU of control apparatus 10c is conditioned to selectively control operation of the electric motor 15, electromagnetic clutch 18 and transmission 13a. When applied with detection signals from the sensors S1–S7, the CPU determines each condition of the electric motor 15, clutch 18 and transmission 13a to be activated and applies command signals to the driving circuit 10c2 for controlling each operation of the electric motor 15, clutch 18 and transmission 13a.

Figure 3:
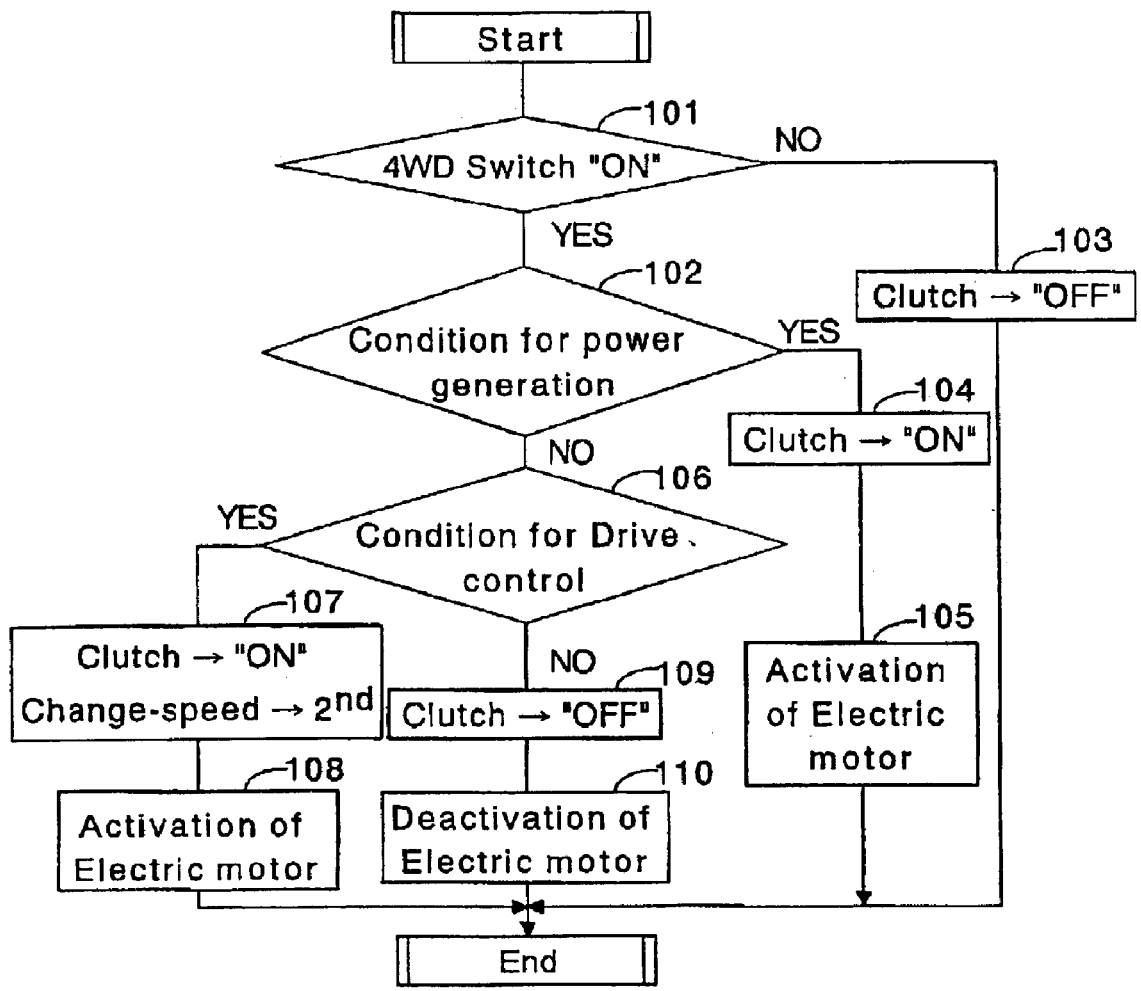
FIG. 3 is a flow chart of a control program executed in the electric control apparatus.

Illustrated in FIG. 3 is a control program for the electric motor 15, electromagnetic clutch 18 and power transmission 13a. At step 101 of the control program, the CPU of electric control apparatus 10c determines whether the 4-WD switch was tuned on or not. If the answer at step 101 is "Yes", the CPU determines at step 102 whether the electric motor 15 was selected in a condition for electric power generation or not. If the answer at step 101 is "No", the CPU produces a command signal for turning off the electromagnetic clutch 18.

The determination for control of the power generation of the electric motor 15 is conducted on a basis of the voltage of the high voltage battery 17, the road wheel speed and an operated condition of the brake. When the voltage of the high voltage battery 17 and the road wheel speed are respectively less than a predetermined value in operation of the brake, the CPU determines a "Yes" answer at step 102 and causes the program to proceed to step 104. Then, the CPU produces at step 104 a command signal for turning on the electromagnetic clutch 18 and produces at step 105 a command signal for effecting the power generation of electric motor 15. In such an instance, the electric motor 15 is driven by the rear road wheels in response to the command signal from the CPU to produce a regenerative electric power therefrom, and the high voltage battery 17 is charged with the regenerative electric power applied from the electric motor 15 through the driving circuit 10c2, resulting rise of the voltage of battery 17 more than the predetermined value.

When the answer at step 102 is "No", the CPU determines at step 106 where the electric motor 15 is selected in a condition to be activated or not. If the answer at step 106 is "Yes", the CPU produces at step 107 a command signal for turning on the electromagnetic clutch 18 and a command signal for switching over the power transmission 13a to the $2^{nd}$ speed. The determination for control of the electromagnetic clutch 18 and power transmission 13a is conducted on a basis of the detection signals applied from the sensors S1–S7 in a condition where the opening degree of the accelerator is more than a predetermined value during low speed travel of the vehicle. When applied with the command signal from the CPU at step 108, the electric motor 15 is activated by the electric power applied from the high voltage battery 17 through the driving circuit 10c2 to drive the rear road wheels 19, 19 for effecting travel of the vehicle at the four-wheel drive mode. When the answer at step 106 is "No", the CPU produces at step 109 a command signal for turning off the electromagnetic clutch 18 and produces a command signal for disconnecting the high voltage battery 17 from the electric motor 15 to maintain the electric motor 15 in an inoperative condition.

In operation of the electric control apparatus 10c, the control program is repeatedly executed by the CPU as described above. When the $\mu$ value of the road surface becomes less than a predetermined value during travel of the vehicle on the snow, the drive mode of the snow is selected by operation of the snow mode switch. In such an instance, the CPU determines a "Yes" answer at step 106 and causes the program to proceed to step 107. Thus, the CPU produces at step 107 the command signal for turning on the electromagnetic clutch 18 and produces at step 108 the command signal for switching over the power transmission 13a to the $2^{nd}$ speed, thereby to effect travel of the vehicle at the four-wheel drive mode.

In the automotive vehicle of the front-and-rear wheel drive type quipped with the drive system, travel of the vehicle at the four-wheel drive mode can be smoothly effected in necessity under control of the electric control apparatus 10c, and the electric power for drive of the rear road wheels 19d is stored in the high voltage battery in accordance with consumption of the electric power. As in the drive system, the high voltage battery 17 is adapted as a source of electric power for drive of the electric motor 15, the conventional generator only for drive of the electric motor 15 can be removed from this kind of drive system, and the high voltage battery 17 can be mounted in a limited space of the vehicle body structure. Thus, the drive system according to the present invention can be installed on the vehicle body structure in a simple manner.

As the electric power stored in the high voltage battery 17 is used as the source of drive power for the electric motor 15, an automotive vehicle of the four-wheel drive type can be provided at a low cost without any significant change in design of a two-wheel drive type vehicle.

In the drive system, the low voltage battery 14 is charged with the electric power supplied from the generator 12 driven by the prime mover 11 in the primary drive mechanism, and the DC-DC converter 16 is provided to convert the charged power of low voltage battery 14 into a high voltage for charging the high voltage battery 17. The DC-DC converter 16 as well as the high voltage battery 17 can be mounted in a limited space on the vehicle body structure. The electric motor 15 for drive of the rear road wheels 19d acts to selectively convert mechanical energy to electric energy for charging the high voltage battery 17. Thus, the high voltage battery is charged with the regenerative power applied from the electric motor 15. This is useful to effectively utilize the regenerative electric power of electric motor 15.

In the drive system, the electromagnetic clutch 18 for transmitting the drive power of electric motor 15 to the rear road wheels 19d and the component parts of the drive system are operated under control of the electric control apparatus 10c. This is also useful to operate the drive system in a reliable manner thereby to enhance the utilization efficiency of energy. In the drive system, the operation of both the primary and ancillary drive mechanisms at the four-wheel drive mode is synchronized with the operation of both the primary and ancillary drive mechanisms at the drive mode on the snow in such a manner that the change-speed step of power transmission 13a is switched over to the $2^{nd}$ speed at the four-wheel drive mode. Accordingly, even when the front road wheels of the vehicle are driven on a road surface of low $\mu$ at the four-wheel drive mode, the drive power of the power transmission does not become excessive. This is effective to prevent the front road wheels 13e from racing and to prevent deterioration of the traction efficiency of the vehicle at the four-wheel drive mode.

Although in the electric control apparatus 10c of the drive system, the control program is arranged to switch over the change-speed step of power transmission 13a to the $2^{nd}$ speed during operation of the electric motor 15, the control program may be arranged to switch over the power transmission to an appropriate speed more than the 1$^{st}$ speed and less than the 2$^{nd}$ speed. In the case that the power transmission does not have a fixed speed step, the control program may be arranged to switch over the power transmission to an appropriate speed less than a maximum speed reduction ratio.

In FIG. 4, there is schematically illustrated a second embodiment of a drive system for an automotive vehicle of the front-and-rear wheel drive type. The drive system in this embodiment includes a primary drive mechanism 20a for drive of a set of front road wheels 23e, an ancillary drive mechanism 20b for drive of a set of rear road wheels 29d and an electric control apparatus 20c for the ancillary drive mechanism 20b. Although the ancillary drive mechanism 20b is slightly different in construction from the ancillary drive mechanism 10 in the first embodiment, the other components and construction of the second embodiment are substantially the same as those in the first embodiment and designated with the similar reference numerals of 20 order numbers.

The ancillary drive mechanism 20b includes an electric motor 25, a high voltage battery 27 and an electromagnetic clutch 28 without providing the DC-DC converter in the first embodiment. In the ancillary drive mechanism 20b, the high voltage battery 27 is separated from the low voltage battery 24 only for accessories. The electric motor 25 is provided to selectively convert electric energy to mechanical energy or vice versa. In the ancillary drive mechanism 20b, the electric motor 25 is driven by the electric power applied from the high voltage battery 27 through a driving circuit of the electric control apparatus 20c. The drive power of electric motor 25 is transmitted to drive shafts 29c through a speed reduction gear train 29a, the electromagnetic clutch 28 and a differential 29b thereby to drive the rear road wheels 29d. When applied with a drive power from the rear road wheels 29d, the electric motor 25 acts as a generator to produce a regenerative electric power, and the high voltage battery 27 is charged with the regenerative electric power supplied from the electric motor 25 through the driving circuit of the electric control apparatus 20c.

In this embodiment, the ancillary drive mechanism 20b is activated under control of the electric control apparatus 20c in such a manner that travel of the vehicle at the four-wheel drive mode is smoothly effected in necessity and that the electric power for drive of the rear road wheels 29d is stored in the high voltage battery 27 in accordance with consumption of the electric power. As the electric power stored in the high voltage battery 27 is used as the source of drive power for the electric motor 25 without providing a conventional generator for electric motor, the drive system can be installed on the vehicle body structure in a simple manner as in the first embodiment.

In the drive system 20, the electric power of low voltage battery 24 is not used as the source of electric power for the high voltage battery 27 without providing the DC-DC converter in the first embodiment. This is useful to provide the drive system at a low cost. In the drive system 20, the operation of both the primary and ancillary drive mechanisms at the four-wheel drive mode is synchronized with the operation of both the primary and ancillary drive mechanisms at the drive mode on the snow in such manner that the change-speed step of power transmission 23a is switched over to the 2$^{nd}$ speed at the four-wheel drive mode as in the first embodiment. Accordingly, even when the front road wheels 23e are driven on a road surface of low $\mu$ at the four-wheel drive mode, the drive power of the transmission 23a does not becomes excessive. This is effective to prevent the front road wheels 23e from racing and to prevent deterioration of the traction performance of the vehicle at the four-wheel drive mode.

In FIG. 5, there is schematically illustrated a third embodiment of a drive system 30 for an automotive vehicle of the front-and-rear wheel drive type. The drive system 30 in this embodiment includes a primary drive mechanism 30a for drive of a set of front road wheels 33e, an ancillary drive mechanism 30b for drive of a set of rear road wheels 36d and an electric control apparatus 30c for both the drive mechanisms 30a and 30b.

The primary drive mechanism 30a includes a prime mover 31 in the form of an internal combustion engine and a generator 32 driven by the prime mover 31. In the primary drive mechanism 30a, the drive power of prime mover 31 is transmitted to drive shafts 33d through a power transmission 33a, a speed reduction gear train 33b and a front differential 33c so that the front road wheels 33e are driven by the drive shafts 33d. In operation of the primary drive mechanism 30a, the generator 32 is driven by the prime mover 31 to generate an electric power.

The ancillary drive mechanism 30b includes an electric motor 34 and an electromagnetic clutch 35. The electric motor 34 is driven by an electric power of high voltage. When the electric motor 34 is driven in a condition where the electromagnetic clutch 35 was engaged, the drive power of electric motor 35 is transmitted to drive shafts 36c through a speed reduction gear train 36a, the clutch 35 and a rear differential 36b so that the rear road wheels 36d are driven by the drive shaft 36c.

The generator 32 in the primary drive mechanism 30a is arranged to be selectively connected to a low voltage battery 38 and the electric motor 34 by means of a changeover switch 37. The low voltage battery 38 acts to operate various accessories 39 mounted on the vehicle, and the changeover switch 37 is switched over under control of the electric control apparatus 30c through a driving circuit 30c2.

Figure 6:
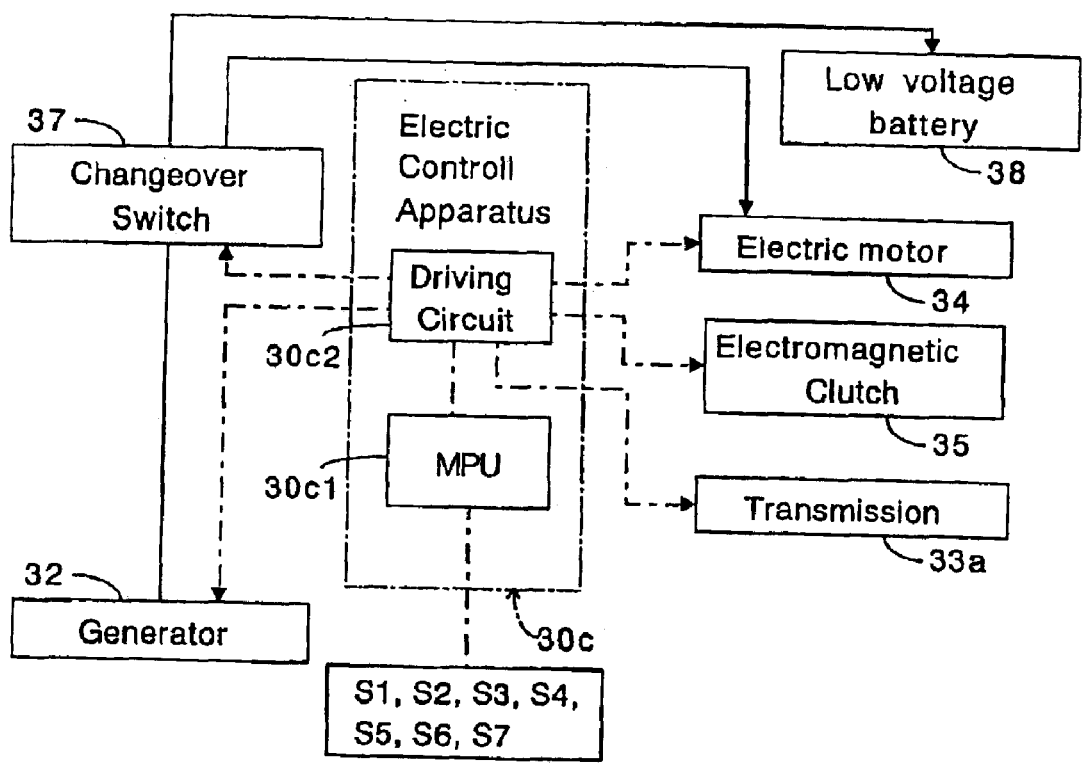
FIG. 6 is a block diagram of an electric control apparatus for the drive system shown in FIG. 5.

As shown in FIG. 6, the electric control apparatus 30c includes a microprocessor or MPU 30c1 which is connected to an accelerator sensor S1, a wheel speed sensor S2, a brake sensor S3, a voltage sensor S4 of the low voltage battery, a switch sensor S5 for detecting a condition of a 4 WD switch, a $\mu$-sensor S6 for detecting road surface conditions and a change-speed sensor S7 for detecting a change-speed step of the transmission 33a.

The MPU 30c1 includes a central processing unit or CPU and a memory to store a control program and data for controlling the electric motor 34, the electromagnetic clutch 35 and the transmission 33a. The CPU is applied with detection signals from the sensors S1–S7 through an interface to determine conditions of the electric motor 34, clutch 35, changeover switch 37 and transmission 33a to be activated and to output command signals for activating the electric motor 34, clutch 35, changeover switch 37 and transmission 33*a* through the interface.

The driving circuit 30*c*2 is provided to control each operation of the changeover switch 37 and electric motor 34 in response to the command signal applied from the CPU in MPU 30*c*1 and to control on-off operation of the electromagnetic clutch 35 and changeover of the power transmission 33*a* in response to the command signal applied from the CPU. The memory of MPU 10*c*1 is arranged to store a control program for selecting a four-wheel drive mode of the vehicle and a control program for selecting a drive mode on the snow (or on a road surface of low $\mu$). In this embodiment, both the control programs are executed in common by the CPU of MPU 30*c*1. Thus, the 4 WD switch for selection of the four-wheel drive mode and a snow mode switch for selection of the drive mode on the snow are provided in the form of a common switch.

When the 4 WD switch is turned on to select the four-wheel drive mode, the CPU of control apparatus 30*c* is conditioned to selectively control each operation of the electric motor 34, clutch 35, changeover switch 37 and power transmission 33*a*. When applied with detection signals from the sensors S1–S7, the CPU determines each condition of the electric motor 34, clutch 35, changeover switch 37 and power transmission 33*a* to be activated and applies command signals for controlling each operation of the electric motor 34, clutch 35, changeover switch 37 and power transmission 33*a*.

That is to say, when the 4 WD switch is turned on, the CPU of control apparatus 30*c* determines whether the four-wheel drive mode is in a condition to be selected or not. If the answer is "Yes", the CPU produces a command signal for engaging the clutch 35 and determines whether the changeover switch 37 is in a condition to be switched over or not. If the answer is "Yes", the CPU produces a command signal for switching over the changeover switch 37 so that the generator 32 is switched over from a low voltage side to a high voltage side and connected to the electric motor 34 and that the power transmission 33 is switched over to the $2^{nd}$ speed.

With such control described above, the electric motor 34 is driven by a high voltage power applied from the generator 32 to drive the vehicle at the four-wheel drive mode. The determination for selection of the four-wheel drive mode is conducted in response to detection signals applied from the accelerator sensors S1, wheel speed sensor S2, brake sensor S3, voltage sensor S4 of the low voltage battery and switch sensor S5 of the 4 WD switch. Thus, only when the low voltage battery 38 is sufficiently charged, the four-wheel drive mode is selected at start, acceleration or low speed travel of the vehicle.

For such control as described above, the CPU executes a control program shown by a flow chart in FIG. 7. At step 121, the CPU determines a residual amount of charged voltage of low voltage battery 38. If the residual amount of charged voltage is less than a predetermined amount A, the CPU determines a "No" answer and causes the program to proceed to step 122. If the residual amount of charged voltage is more than the predetermined amount A, the CPU determines a "Yes" answer at step 121 and causes the program to proceed to step 123.

At step 122, the CPU determines a currently consumed amount of the electric power at the low voltage side. If the currently consumed amount of the electric power is less than a predetermined amount B, the CPU determines a "No" answer at step 122 and causes the program to proceed to step 123. If the currently consumed amount of the electric power is more than the predetermined amount B, the CPU determines a "Yes" answer at step 122 and causes the program to proceed to step 124. At step 124, the CPU maintains the generator 32 in connection with the low voltage battery 38 and accessories 39 to supply an electric power of low voltage to the low voltage battery 38 and accessories 39.

At step 123, the CPU determines whether the vehicle is in a condition to be driven at the four-wheel drive mode or not. If the answer at step 123 is "No", the CPU causes the program to proceed to step 124. Thus, the CPU maintains at step 124 the generator 32 in connection with the low voltage battery 38 and accessories 39 to supply an electric power of low voltage to the low voltage battery 38. If the answer at step 123 is "Yes", the CPU produce at step 125 command signals for activating the electromagnetic clutch 35, for switching over the power transmission to the $2^{nd}$ speed, for switching over the changeover switch 37 to the input side of electric motor 34, and for switching over the generator 32 to the high voltage side. Thus, the electric motor 34 is driven by the electric power of high voltage applied from the generator 32 to drive the vehicle at the four-wheel drive mode.

As is understood from the above description, the generator 32 in the drive system 30 is driven by the prime mover 31 to generate an electric power and is selectively connected to the low voltage battery 38 and accessories 39 and to the electric motor 34 at the high voltage side under control of the electric control apparatus 30*c*. With such arrangement, the electric motor 34 is driven by the electric power applied from the generator 32 to drive the rear road wheels 36 at the four-wheel drive mode.

As in the drive system, the generator 32 is adapted as a source of electric power for drive of the electric motor 34, the conventional generator only for drive of the electric motor 34 is not required. This is useful to install the drive system on the vehicle body structure in a simple manner. In addition, an automotive vehicle of the front-and-rear wheel drive type can be provided at a low cost without any significant change in design of a two-wheel drive type vehicle.

In the case that it is required to drive the vehicle at the four-wheel drive mode at for a short time at start or during low speed travel, the electric motor 34 is driven by the electric power supplied from the generator 32, while the accessories 39 at the low voltage side are supplied with the electric power from the low voltage battery 37. In such an instance, the electric power required for activation of the accessories 39 at the low voltage side temporarily becomes insufficient. To avoid problems caused by insufficient supply of the electric power to the accessories 39, the generator 32 is disconnected from the electric motor 34 at the high voltage side under control of the electric control apparatus 30*c*. Thus, the operation at the four-wheel drive mode is temporarily suspended to fill up a deficiency in supply of the electric power to the accessories 39.

In the drive system, the operation of the primary and ancillary drive mechanism at the four-wheel drive mode is synchronized with the operation of the primary and ancillary drive mechanisms at the drive mode on the snow in such a manner that the power transmission 33a is switched over to the $2^{nd}$ speed at the four-wheel drive mode under control of the electric control apparatus 30c. Accordingly, even when the front road wheels 33e of the vehicle are driven on a road surface of low $\mu$ at the four-wheel drive mode, the drive power of the power transmission does not become excessive. This is effective to prevent racing of the front road wheels and to prevent deterioration of the traction efficiency of the vehicle at the four-wheel drive mode.

Although in the electric control apparatus 30c of the drive system, the control program is arranged to switch over the power transmission 33a to the $2^{nd}$ speed during operation of the electric motor 34, the program may be arranged to switch over the power transmission to an appropriate speed more than the $1^{st}$ speed and less than the $2^{nd}$ speed. In the case that there is not any fixed change-speed step, the power transmission may be switched over to an appropriate speed less than a maximum speed reduction ratio.

What is claimed is:

1. A drive system for an automotive vehicle of the front-and-rear wheel drive type, comprising:
   a primary drive mechanism for drive of a set of primary road wheels, wherein the primary road wheels are driven by operation of the primary drive mechanism at a two-wheel drive mode;
   an ancillary drive mechanism for drive of a set of ancillary road wheels, wherein the primary and ancillary road wheels are respectively driven by operation of the primary and ancillary drive mechanisms at a four-wheel drive mode;
   a manual switch which switches the drive system between the two wheel drive mode and the four wheel drive mode; and
   restriction means for restricting a drive power applied to the primary road wheels when the vehicle is driven at the four wheel drive mode, as compared to a drive power applied to the primary road wheels when the vehicle is driven at the two wheel drive mode.

2. A drive system for an automotive vehicle as claimed in claim 1, wherein said restriction means comprises means for restricting a drive power applied from the primary drive mechanism to the primary road wheels.

3. A drive system for an automotive vehicle as claimed in claim 1, wherein said restriction means comprises means for restricting a drive power from a power transmission of the primary drive mechanism to the primary road wheels.

4. A drive system for an automotive vehicle as claimed in claim 1, wherein the operation of both the primary and ancillary drive mechanisms at the front-and-rear wheel drive mode is synchronized with the operation of both the primary and ancillary drive mechanism at a drive mode on a road surface of low $\mu$.

5. A drive system for an automotive vehicle as claimed in claim 1, further comprising an electric control apparatus for the primary and ancillary drive mechanisms, wherein the electric control apparatus includes means for producing a command signal for synchronizing the operation of both the primary and ancillary drive mechanisms at the front-and-rear wheel drive mode with the operation of the primary and ancillary drive mechanisms at a drive mode on a road surface of low $\mu$.

6. A drive system for an automotive vehicle as claimed in claim 1, further comprising an electric control apparatus for the primary and ancillary drive mechanisms, wherein the electric control apparatus includes means for producing a command signal for selecting a front-and-rear wheel drive mode when the vehicle is traveling at a lower speed than a predetermined speed.

7. A drive system for an automotive vehicle as claimed in claim 1, further comprising an electric control apparatus for the primary and ancillary drive mechanisms, wherein the electric control apparatus includes means for producing a command signal for switching over a power transmission to a speed less than a maximum speed reduction ratio at the front-and-rear wheel drive mode.

8. A drive system for an automotive vehicle as claimed in claim 1, wherein the primary drive mechanism comprises an internal combustion engine of the vehicle for drive of the primary road wheels, while the ancillary drive mechanism comprises an electric motor for drive of the ancillary road wheels.

9. A drive system for an automotive vehicle as claimed in claim 1, wherein the primary drive mechanism comprises an internal combustion engine for drive of a set of front road wheels, while the ancillary drive mechanism comprises an electric motor for drive of a set of rear road wheels, and wherein a generator driven by the internal combustion engine is provided as a source of drive power for the electric motor.

* * * * *